(12) United States Patent
Ichikawa

(10) Patent No.: US 6,634,761 B2
(45) Date of Patent: Oct. 21, 2003

(54) PLANAR LIGHT SOURCE DEVICE AND LIQUID CRYSTAL DISPLAY DEVICE

(75) Inventor: Kouji Ichikawa, Nishigoshi-machi (JP)

(73) Assignee: Advanced Display Inc., Kikuchi-gun (JP)

( * ) Notice: Subject to any disclaimer, the term of this patent is extended or adjusted under 35 U.S.C. 154(b) by 127 days.

(21) Appl. No.: 09/925,653

(22) Filed: Aug. 10, 2001

(65) Prior Publication Data

US 2002/0041492 A1 Apr. 11, 2002

(30) Foreign Application Priority Data

Oct. 5, 2000 (JP) .................................... 2000-305611

(51) Int. Cl.[7] ................................................ F21V 7/04
(52) U.S. Cl. ............................ 362/31; 362/26; 362/561
(58) Field of Search ........................ 362/26, 31, 561, 362/582, 581, 277, 319, 331

(56) References Cited

U.S. PATENT DOCUMENTS

| | | | | |
|---|---|---|---|---|
| 5,666,172 A | * | 9/1997 | Ida et al. ...................... | 362/31 |
| 5,788,356 A | * | 8/1998 | Watai et al. ................... | 362/31 |
| 6,435,685 B2 | * | 8/2002 | Matsushita .................... | 362/31 |
| 6,443,583 B1 | * | 9/2002 | Ha .............................. | 362/31 |

\* cited by examiner

*Primary Examiner*—Sandra O'Shea
*Assistant Examiner*—Peggy A Neils
(74) *Attorney, Agent, or Firm*—Oblon, Spivak, McClelland, Maier & Neustadt, P.C.

(57) ABSTRACT

A planar light source device has a linear light source, a light guide plate for guiding light from the linear light source through the whole plane thereof, a lamp reflector for reflecting light from the linear light source in the direction of the light guide plate, an optical sheet positioned on the light output face of the light guide plate, and a frame member for regulating the positions of the linear light source, the light guide plate, the lamp reflector and the optical sheet. The position of the optical sheet in the planar direction is regulated by the side face portion of a protruding section formed in a portion of the frame member. Consequently, it is possible to regulate a position of an optical sheet by means of a simple structure.

13 Claims, 5 Drawing Sheets

Plane A—A

PLANAR LIGHT SOURCE DEVICE AND LIQUID CRYSTAL DISPLAY DEVICE

BACKGROUND OF THE INVENTION

1. Field of the Invention

The present invention relates to planar light source device for generating planar light, for example, a planar light source device used in a liquid crystal display device.

2. Description of the Related Art

A prior art planar light source device is described here with reference to FIG. 9 and FIG. 10. FIG. 9 is a diagram showing the structure of a planar light source device used in a liquid crystal display device, for example. In this diagram, reference numeral 1 is a frame member, which restricts the position of a linear light source, light guide plate, lamp reflector, optical sheet, and the like. Reference numeral 3 is an optical sheet. The optical sheet 3 is mounted on the upper face of a light guide plate, or the like, whose position is restricted by the frame member 1. This optical sheet 3 does not have a fixed position on the edge, where the linear light source is installed, and generally, it is attached to the frame member 1 on the shorter edge thereof, where the linear light source is not installed.

FIG. 10 shows the installation configuration of the optical sheet 3 and the frame member 1. This configuration shows a section along B—B in FIG. 9. In the diagrams, reference numeral 4 is a light guide plate, and 12 is an adhesive material, such as double-sided tape, or the like. The optical sheet 3 is fixed to the frame member 1 by the adhesive material 12.

In prior technology of this kind, since the optical sheet is attached to the frame member by means of an adhesive material, such as double-sided tape, or the like, the installation task is complicated, and furthermore, it is difficult to perform this installation task with good accuracy.

SUMMARY OF THE INVENTION

In view of the foregoing, it is an object of the present invention to provide a planar light source device in which a position of an optical sheet is regulated by means of a simple structure.

It is another object of the present invention to provide a planar light source device in which a position of a lump reflector is regulated by means of a simple structure.

It is further object of the present invention to provide a planar light source device which enables to expand the optical sheet further up to the upper face of the light guide plate, thereby enabling frame narrowing, whilst also makes it possible to suppress incidence of light from the upper face of the light guide plate.

According to one aspect of the present invention, for achieving the above-mentioned objects, there is provided a planar light source device comprising a linear light source, a light guide plate for guiding light from the linear light source through the whole plane thereof, a lamp reflector for reflecting light from the linear light source in the direction of the light guide plate, an optical sheet positioned on the light output face of the light guide plate, and a frame member for regulating the positions of the linear light source, the light guide plate, the lamp reflector and the optical sheet, wherein the position of the optical sheet in the planar direction thereof is regulated by the side face portion of a protruding section formed in a portion of the frame member.

Consequently, it is possible to regulate a position of an optical sheet by means of a simple structure.

According to other aspect of the present invention, for achieving the above-mentioned objects, there is provided a planar light source device wherein the apex portion of the protruding section contacts the lamp reflector and forces the lamp reflector against the light guide plate.

Consequently, it is possible to regulate a position of a lump reflector by means of a simple structure.

According to other aspect of the present invention, for achieving the above-mentioned objects, there is provided a planar light source device wherein the apex portion of the protruding section contacts the light guide plate, and the side face portion of the protruding section opposite to the side face portion regulating the position of the optical sheet is disposed in such a manner that it coincides approximately with the end face of the light guide plate.

Consequently, it is possible to expand the optical sheet further up to the upper face of the light guide plate, thereby enabling frame narrowing, whilst also makes it possible to suppress incidence of light from the upper face of the light guide plate.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

A preferred embodiment of the invention will now be described in detail referring to the accompanying drawings.

Embodiment 1

Figure 1:
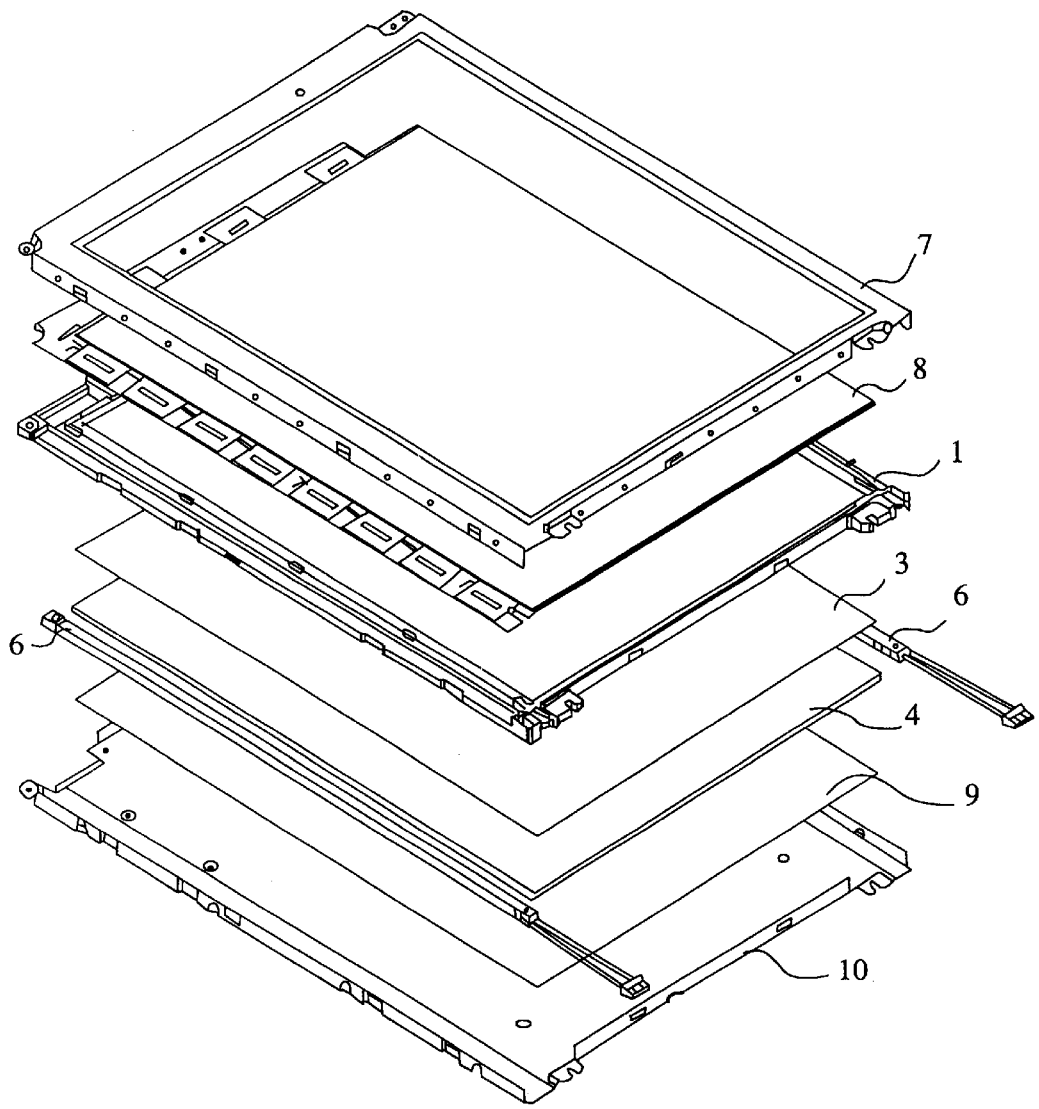
FIG. 1 is an oblique diagram showing the structure of a liquid crystal display device using a planar light source device relating to an embodiment of the present invention.

FIG. 1 is an oblique diagram showing the structure of a liquid crystal display device using a planar light source device relating to an embodiment of the present invention. In FIG. 1, reference numeral 1 is a frame member which restricts the positions of a linear light source, light guide plate, lamp reflector, optical sheet, and the like. Reference numeral 3 is an optical sheet, being a prismatic sheet, diffusion sheet, or the like. Reference numeral 4 is a light guide plate for guiding light uniformly within a display surface, and reference numeral 6 is a lamp reflector constituted by a tubular reflector member which accommodates a linear light source 1 therein. Reference numeral 7 is a front frame, reference numeral 8 is a liquid crystal panel, reference numeral 9 is a reflective sheet, and reference numeral 10 is a rear frame. A liquid crystal display device is constituted by affixing these constituent elements by means of screws or other fixing method. Here, the optical sheet 3 is constituted by one or a plurality of sheets.

Figure 2:
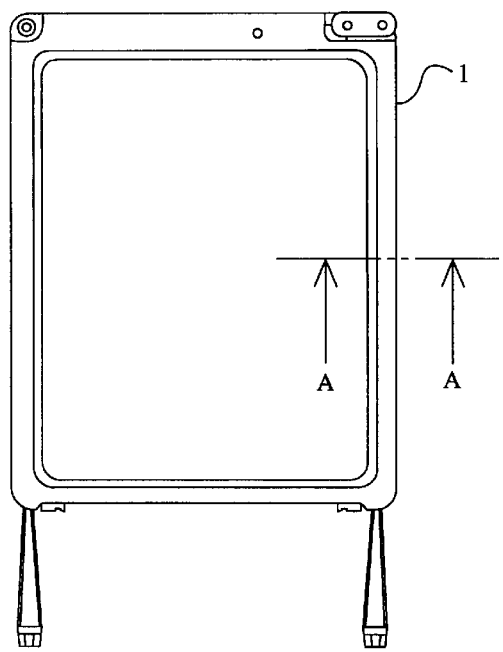
FIG. 2 is a diagram showing the structure of a liquid crystal display device using a planar light source device relating to an embodiment of the present invention.
Figure 3:
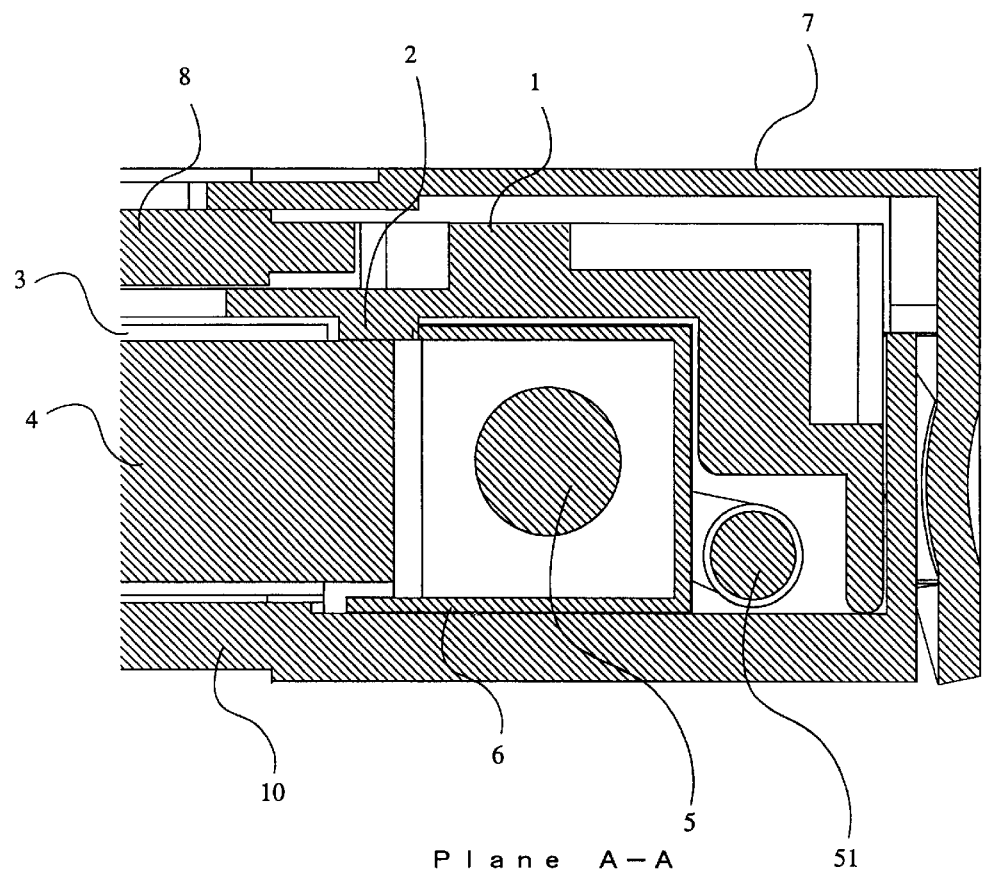
FIG. 3 is a sectional diagram along plane A—A of the planar light source device shown in FIG. 2.

FIG. 3 is a sectional diagram along plane A—A of the planar light source device shown in FIG. 2. In FIG. 3, elements attached with the same numerals as the numerals in FIG. 1 indicate elements which are the same or equivalent to those in FIG. 1, and description thereof is omitted. Reference numeral 2 is a protruding section provided on a portion of the frame member 1. Reference numeral 5 is a linear light source, such as a fluorescent tube, or the like, for example, and reference numeral 51 is a lamp cable for the lamp 5. Here, the linear light source 5 may be constituted by one or a plurality of lamps.

In the present embodiment, the protruding section 2 may be formed as a band-shaped member parallel to the linear light source 5, or the protruding section 2 may be formed as a band-shaped member which is parallel to the linear light source 5 and also surrounds the whole perimeter of the optical sheet 3. Moreover, the protruding section 2 may also be formed in a non-continuous manner. The protruding section 2 is formed integrally with the frame member 1 in such a manner that it is located on one side of the light guide plate 4 adjacent to the end portion thereof, or at either end thereof. The apex portion (lower portion) of the protruding section 2 contacts the upper face of the light guide plate 4. Moreover, one side face of the protruding section 2 regulates the position of the optical sheet 3. The side face of the protruding section 2 opposite to the side regulating the position of the optical sheet 3 is positioned to the outer side of the end face of the light guide plate 4. Thereby, the optical sheet 3 can be expanded further up to the end face of the light guide plate 4, and hence frame narrowing can be achieved, and incidence of light from the upper face of the light guide plate 4 can be restricted by the protruding section. It is also possible to regulate the position of the optical sheet 3, without performing installation tasks having poor accuracy.

Embodiment 2

Figure 4:
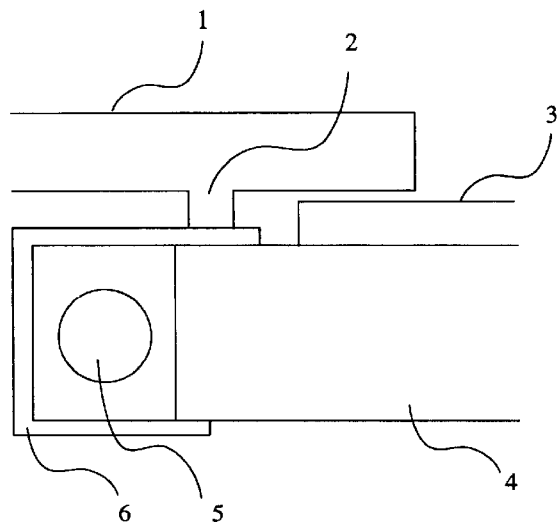
FIG. 4 shows a sectional view of the main constituent elements of a planar light source device relating to a second embodiment.

FIG. 4 shows a sectional view of the main constituent elements of a planar light source device relating to this second embodiment. The elements attached with the same numerals as the numerals in FIG. 1 or FIG. 3 indicate elements which are the same or equivalent to those in FIG. 1, and description thereof is omitted.

In the planar light source device relating to this second embodiment, a portion of a lamp reflector 6 is interposed between the apex portion of the protruding section 2 and the upper face of light guide plate 4. This protruding section 2 forces the lamp reflector 6 against the light guide plate 4. Thereby, the position of the lamp reflector 6 can be fixed, and the position of the optical sheet 3 can also be regulated at the same time.

Embodiment 3

Figure 5:
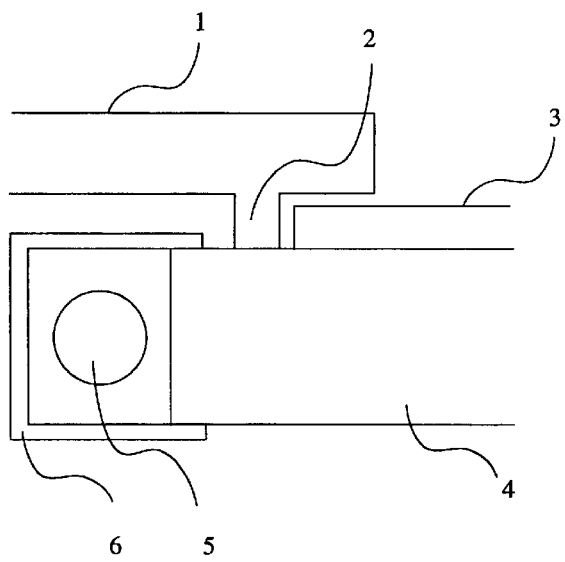
FIG. 5 shows a sectional view of the main constituent elements of a planar light source device relating to a third embodiment of the present invention.

FIG. 5 shows a sectional view of the main constituent elements of a planar light source device relating to a third embodiment of the present invention. The elements attached with the same numerals as the numerals in FIG. 1 or FIG. 3 indicate elements which are the same or equivalent to those in FIG. 1, and description thereof is omitted.

By positioning the protruding section 2 between the lamp reflector 6 and the optical sheet 3, it is possible to regulate the positions of both the lamp reflector 6 and the optical sheet 3. In this embodiment, similarly to the first and second embodiments, the protruding section 2 does not have to be formed in a continuous manner.

Embodiment 4

Figure 6:
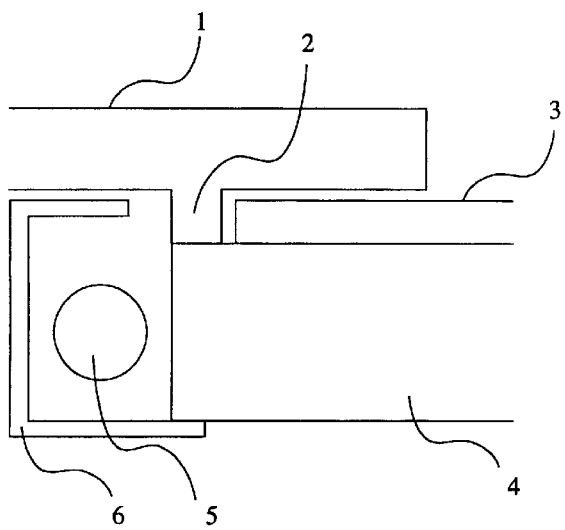
FIG. 6 shows a sectional view of the main constituent elements of a planar light source device relating to a fourth embodiment of the present invention.

FIG. 6 shows a sectional view of the main constituent elements of a planar light source device relating to a fourth embodiment of the present invention. The elements attached with the same numerals as the numerals in FIG. 1 or FIG. 3 indicate elements which are the same or equivalent to those in FIG. 1, and description thereof is omitted.

In this planar light source device, the side face of the protruding section 2 adjacent to the planar light source coincides with the end face of the light guide plate 4. By causing the side face of the protruding section to coincide with the light guide plate 4 in this manner, it is possible to move the position of the protruding section away from the display area, and it is also possible to move the end face of the optical sheet away from the display area. As the frame is narrowed, the distance from the display area to the protruding section reduces, giving rise to a situation where the end face of the optical sheet appears in the display area. By adopting the present structure, it is possible to expand the optical sheet further up to the upper face of the light guide plate, thereby enabling frame narrowing, whilst also making it possible to suppress incidence of light from the upper face of the light guide plate, due to the protruding section.

Embodiment 5

Figure 7:
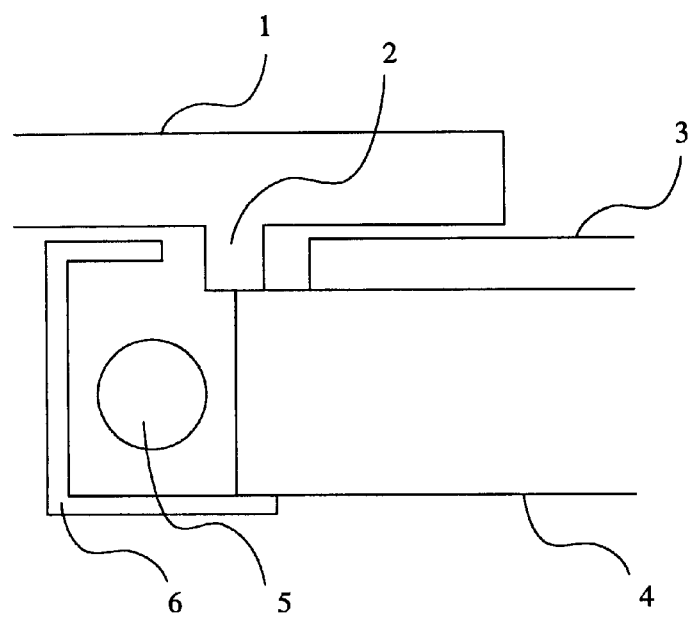
FIG. 7 shows a sectional view of the main constituent elements of a planar light source device relating to a fifth embodiment of the present invention.

FIG. 7 shows a sectional view of the main constituent elements of a planar light source device relating to a fifth embodiment of the present invention. The elements attached with the same numerals as the numerals in FIG. 1 or FIG. 3 indicate elements which are the same or equivalent to those in FIG. 1, and description thereof is omitted.

In this fifth embodiment, in particular, the protruding section 2 incorporates the inner face of the light guide plate 4 and the end of the light guide plate 4, and has a structure whereby it extends beyond the end of the light guide plate 4. In other words, the protruding section 2 is such that it contacts the light guide plate 4 at the apex portion thereof, whilst the side face portion thereof which is opposite to the side face regulating the position of the optical sheet 3 is positioned to the outer side of the end face of the light guide plate 4. By adopting this structure, it is possible to enlarge the optical sheet further than in the fourth embodiment, thereby achieving greater frame narrowing. Moreover, it is also possible to suppress incidence of light from the upper face of the light guide plate, to a greater extent than in the fourth embodiment.

Embodiment 6

Figure 8:
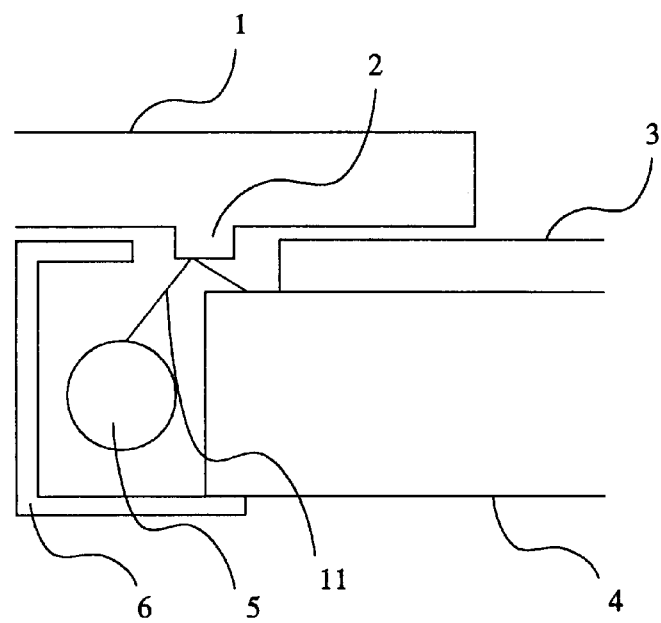
FIG. 8 shows a sectional view of the main constituent elements of a planar light source device relating to a sixth embodiment of the present invention.
Figure 9:
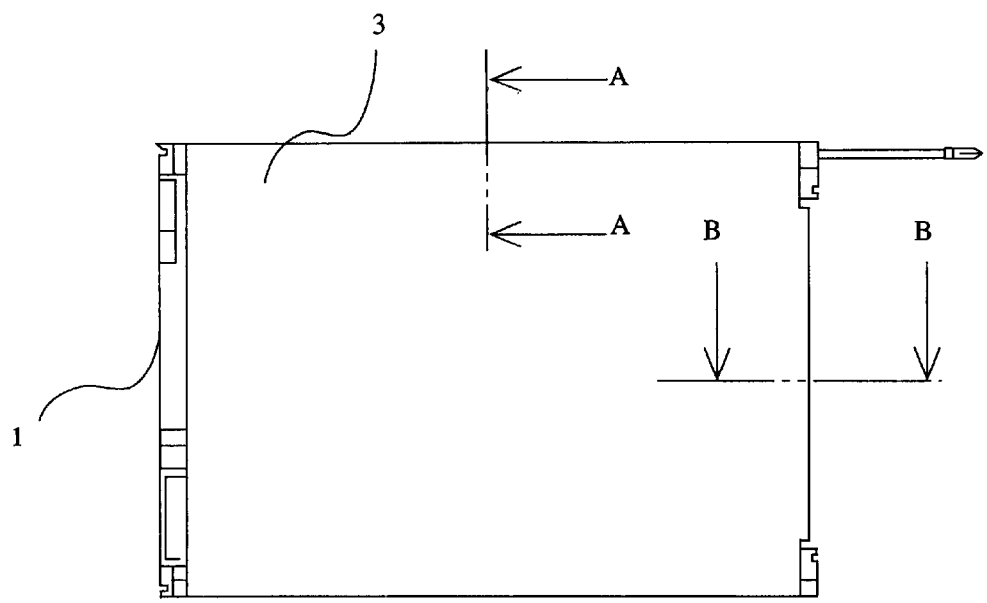
FIG. 9 is a diagram showing the structure of a planar light source device used in a liquid crystal display device.
Figure 10:
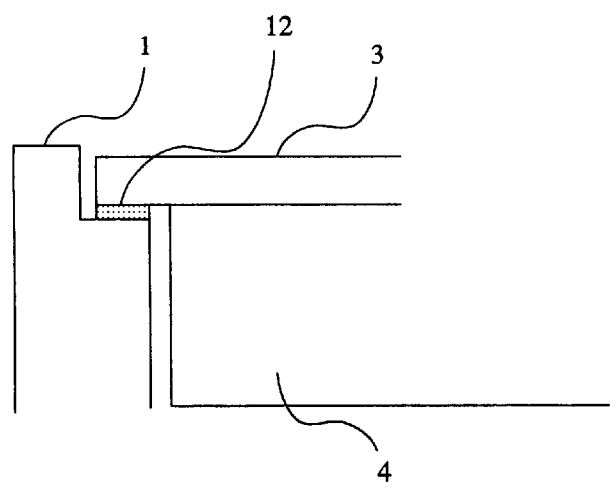
FIG. 10 shows the installation configuration of an optical sheet and a frame member.

FIG. 8 shows a sectional view of the main constituent elements of a planar light source device relating to a sixth embodiment of the present invention. The elements attached with the same numerals as the numerals in FIG. 1 or FIG. 3 indicate elements which are the same or equivalent to those in FIG. 1, and description thereof is omitted.

In FIG. 8, reference numeral 11 is light emitted from the lamp 5. The light emitted from the lamp 5 which is incident on the end face of the light guide plate 4 causes no problems, but the light which is incident on the upper face of the light guide plate 4 causes optical irregularities. Therefore, the light 11 in FIG. 8 causes the optical irregularities.

In this sixth embodiment, in particular, the protruding section 2 has a colour which absorbs light. Colours which absorb light include dark colours, such as black, gray, and the like.

In the fourth and fifth embodiments, supposing that variations occur in assembly, then if a gap arises between the lower face of the protruding section 2 and the upper face of the light guide plate 4, a large amount of the light reflected by the protruding section 2 and incident on the upper face of the light guide plate will have been absorbed by the protruding section 2, resulting in a weak quantity of light, which will not affect the display.

According to the present invention, it is possible to regulate the position of the optical sheet, and the like, in a planar light source device, by means of a simple structure.

While preferred embodiments of the invention have been described using specific terms, such description is for illustrative purposes only, and it is to be understood that changes and variations may be made without departing from the spirit or scope of the following claims.

What is claimed is:

1. A planar light source device comprising:

a light source;

a light guide plate for guiding light from said light source through a whole plane thereof;

a reflector for reflecting light from said light source in a direction of said light guide plate;

an optical sheet positioned on a light output face of said light guide plate; and a frame member for regulating positions of said light source, said light guide plate, said reflector, and said optical sheet;

wherein a position of said optical sheet in a planar direction thereof is regulated by a side face portion of a protruding section formed in a portion of said frame member, and said protruding section surrounds an entire perimeter of said optical sheet.

2. The planar light source device in accordance with claim 1, wherein an apex portion of said protruding section contacts said reflector and forces said reflector against said light guide plate.

3. The planar light source device in accordance with claim 2, wherein a total length of a height of the apex portion of said protruding section plus a thickness of said reflector inserted between the apex portion and said light guide plate is greater than a thickness of said optical sheet.

4. A planar light source device comprising:

a light source;

a light guide plate for guiding light from said light source through a whole plane thereof;

a reflector for reflecting light from said light source in a direction of said light guide plate;

an optical sheet positioned on a light output face of said light guide plate; and a frame member for regulating positions of said light source, said light guide plate, said reflector, and said optical sheet;

wherein a position of said optical sheet in a planar direction thereof is regulated by a side face portion of a protruding section formed in a portion of said frame member, an apex portion of said protruding section contacts said light guide plate, and said reflector is disposed in a concave portion opposite the side face portion regulating the position of said optical sheet.

5. The planar light source device in accordance with claim 4, wherein said protruding section regulates a position of said reflector by means of a side face portion thereof opposite the side face portion regulating the position of said optical sheet.

6. The planar light source device in accordance with claim 4, wherein the side face portion of said protruding section opposite the side face portion regulating the position of said optical sheet is disposed in such a manner that it coincides approximately with an end face of said light guide plate.

7. The planar light source device in accordance with claim 4, wherein the side face portion of said protruding section opposite the side face portion regulating the position of said optical sheet is disposed to an outer side of an end face of said light guide plate.

8. The planar light source device in accordance with claim 4, wherein a height of the apex portion of said protruding section is greater than a thickness of said optical sheet.

9. A liquid crystal display device incorporating the planar light source device in accordance with claim 4.

10. The planar light source device in accordance with claim 1, wherein the side face portion of said protruding section opposite the side face portion regulating the position of said optical sheet is disposed in such a manner that it coincides approximately with an end face of said light guide plate.

11. The planar light source device in accordance with claim 1, wherein the side face portion of said protruding section opposite the side face portion regulating the position of said optical sheet is disposed to an outer side of an end face of said light guide plate.

12. The planar light source device in accordance with claim 1, wherein a height of an apex portion of said protruding section is greater than a thickness of said optical sheet.

13. A liquid crystal display device incorporating the planar light source device in accordance with claim 1.

* * * * *